United States Patent [19]

Guruprasad

[11] Patent Number: 5,714,829
[45] Date of Patent: Feb. 3, 1998

[54] ELECTROMAGNETIC HEAT ENGINES AND METHOD FOR COOLING A SYSTEM HAVING PREDICTABLE BURSTS OF HEAT DISSIPATION

[76] Inventor: Venkata Guruprasad, 35 Oak St., Apt. 86, Brewster, N.Y. 10509-1430

[21] Appl. No.: 370,809

[22] Filed: Jan. 10, 1995

[51] Int. Cl.$^6$ .................................................. H02N 10/00
[52] U.S. Cl. .................................................. 310/306
[58] Field of Search .................................. 310/306, 68 C; 361/676, 688; 136/205

[56] References Cited

U.S. PATENT DOCUMENTS

| | | | |
|---|---|---|---|
| 396,121 | 1/1889 | Tesla | 310/306 |
| 476,983 | 6/1892 | Edison | 310/306 |
| 481,999 | 9/1892 | Berliner | 310/306 |
| 2,391,313 | 12/1945 | Hindle | 310/306 |
| 3,776,780 | 12/1973 | Kanter | 136/228 |
| 3,790,829 | 2/1974 | Roth | 310/306 |
| 4,447,736 | 5/1984 | Katayama | 290/1 R |
| 4,730,137 | 3/1988 | Vollers | 310/306 |
| 5,012,325 | 4/1991 | Mansuria et al. | 257/713 |
| 5,419,780 | 5/1995 | Suski | 136/205 |

OTHER PUBLICATIONS

Spring, K.H., "Chapter 6: Miscellaneous Conversion Methods", *Direction Generation of Electricity*, Academic Press, pp. 360-387 (1965).

Zemensky, Mark W., "Chapter 9: Carnot Cycle and Kelvin Temperature Scale", *Heat and Thermodynamics*, McGraw Hill, pp. 160-161 (1957).

Callen, Herbert B., "Chapter 14: Magnetic and Electric Systems", *Thermodynamics*, John Wiley & Sons, pp. 238-243 (1960).

Tribers, Myron, "Chapter 15: The Introduction of Variables Other than Pressure", *Thermostatics and Thermodynamics*, Van Nostrand, pp. 542-547 (1961).

Rosenweig, Ron E., "Magnetocaloric Energy Conversion", *Ferrofluids*, Exxon Res., Clinton, New Jersey, Cambridge Univ. Press, pp. 161-176 (1985).

J.R. Trueblood et al., "A Vertically Reciprocating NBTI Solenoid Used in a Regenerative Magnetic Refrigerator", IEEE Transactions on Magnetics, vol. 27, No. 2, pp. 2384-2386, (Mar. 1991).

J.R. Row et al., "Conductively Cooled $Nb_3Sn$ Magnet System for a Magnetic Refrigerator", IEEE Transactions on Magnetics, vol. 27, No. 2, pp. 2377-2380 (Mar. 1991).

F.J. Cogswell et al., "A Regenerative Magnetic Refrigerator operating between Liquid Helium and Liquid Hydrogen Reservoirs", IEEE Transactions on Magnetics, vol. 24, No. 2, pp. 1011-1014 (Mar. 1988).

Pendick, Daniel, "Magnetism's Cool Act", *New Scientist*, pp. 21-23 (Sep. 10, 1994).

Taubes, Gary, "Faster Isn't Always Better", IBM Research Magazine, No. 3, pp. 18-23 (1994).

Feyman, *Lectures*, vol. II, sections 35 and 36 (1965).

A.J. Dekker, *Solid State Physics*, chapter 18 (pp. 446-447, 460-461) and chapter 20 (pp. 498-505, 518, 519), Prentice--Hall (1957).

Enrico Fermi, *Thermodynamics*, Introduction (p. X), Dover Republication (1937), original publication Prentice-Hall (1936).

R.S. Tebble & D.J. Craik, *Magnetic Materials*, Wiley-Interscience, pp. 203, 247 (969).

*Primary Examiner*—Stephen L. Stephan
*Assistant Examiner*—Christopher Cuneo
*Attorney, Agent, or Firm*—Ostrager, Chong & Flaherty

[57] ABSTRACT

Magnetic heat engines directly converting heat to electricity, using emf induced by demagnetization. Generated power manifests as negative resistance, and almost any kind and shape of magnetic medium can be used. Electromagnetic engines are also tolerant to non-uniform heating, inherently non-contact and non-mechanical, easy to model and design, and operable at high frequencies. The engines are suitable for augmenting local heating, refrigeration without fluid refrigerants, efficient cooling of cryogenic components, synchronous cooling of digital circuits, completely solid-state power generation, and improvement of power plant efficiency and control.

3 Claims, 8 Drawing Sheets

ELECTROMAGNETIC HEAT ENGINES AND METHOD FOR COOLING A SYSTEM HAVING PREDICTABLE BURSTS OF HEAT DISSIPATION

FIELD OF INVENTION

This invention generally relates to magnetic heat engines. More particularly, it is concerned with an electromagnetic heat engine for directly converting power between heat and electrical forms using magnetism.

BACKGROUND OF INVENTION

Most of the electrical power generated today comes from conversion of heat using steam turbo-generators. Magneto-hydrodynamic and magnetocaloric schemes, while reducing the solid moving parts, still involve an intermediate mechanical form as kinetic energy in a fluid medium, and furthermore, require the medium to be magnetic and conductive at the same time. The flow of fluids is particularly difficult to model and control, and in the above methodologies, the work transfers occur primarily through the physical boundary of the medium, which limits the throughput. The prior art lacks a heat engine in which the work transfer is not confined by the surface of the medium, and which converts heat to electricity directly without involving any intermediate mechanical form whatsoever.

Hitherto only mechanical means have been used for the work transfers in magnetic engines, though they have been known for a century since Nikola Tesla's *Thermo-Magnetic Motor* [U.S. Pat. No. 396,121, issued 15 Jan. 1889]. The mechanism of inductive work transfer had not been conceived of for want of a negative resistance model of power generation. Inadequate thermodynamic insight is also to blame for the slow development of magnetic engines.

Magnetism is made particularly difficult by the lack of a magnetic analog of the kinetic theory of gases, and by the multitude of units and conventions. Among the defects in the prior perception is the relative lack of interest in paramagnetism, the gaseous state of magnetization. Ferromagnetism basically means easier saturation, and holds even less energy than paramagnetism for a given magnetization intensity. Very high intensity fields are therefore needed in prior art magnetic engines to obtain useful power densities.

The maximum magnetic energy densities are close to but less than the realizable energy densities in gases, because gases have no internal structure that can oppose or break under the stress. Higher operating speeds are required for magnetic engines to provide useful power densities, but the mechanical form of prior art magnetic engines severely limits their speeds. In cryogenic refrigeration, for instance, the speeds are down to a few cycles per second.

Incidentally, thermodynamic ideas are lately being applied in the field of digital electronics, for reducing dissipation. Adiabatic switching and reversible computation require lowering of the operating speed, and are inapplicable to existing systems because different logic design principles are prescribed. Further, these schemes involve arguable extrapolations of thermodynamic ideas, particularly while a fundamental theoretical relation between abstract information and physical entropy is yet to be discovered.

Much of the dissipation in modern CMOS technologies is due to motion of charges during logic state transitions. A more direct application of thermodynamics would appear appropriate to the problem, considering that the dissipation is periodic and driven by a clock signal, allowing a heat engine to be operated in synchronization to remove the heat rapidly. The dissipation in a given cycle is however relatively small and randomly located in the physical circuit. Further, it is the peak temperatures instantaneously reached within an individual logic gate or transistor structure that ultimately limits the performance and packing density, and therefore needs to be directly handled. Only magnetism can instantly couple the energy of such predictable bursts over the extent of a chip or system, and the coupling must be inductive rather than mechanical for practical reasons. None of the prior art heat engines qualify for this requirement.

Accordingly, it is an object of the present invention to provide a thermodynamic means for directly converting power between heat and electrical forms using magnetism.

Another object of the invention is to allow use of wider range of magnetic media and operating conditions in magnetic heat engines.

Yet another object of the invention is to provide a means for operating magnetic heat engines at higher speeds, to obtain greater conversion power densities.

A further object is to establish negative resistance as a useful model of power generation with the added feature that the power can be regulated and controlled by a low power input needed to setup the load current.

A still further object of the invention is to provide a direct thermodynamic means for cooling synchronous digital systems.

SUMMARY OF THE INVENTION

In the present invention, these purposes, as well as others which will be apparent, are achieved generally by providing a heat engine which directly converts between heat and electrical power forms using magnetism. More particularly, the invention is concerned with an electromagnetic heat engine in which electrical power is absorbed or generated inductively by a magnetic medium. The invention also improves upon known magnetic heat engines by incorporating a wider range of magnetic media, and by allowing higher operating speeds than was hitherto possible.

Advantage lies in potentially eliminating moving parts, directly converting to electricity at useful power densities, greater choice in selection of magnetic media and operating speeds, more flexible engine and system design, instant thermodynamic use of local hot spots, and the capability to control dissipation in digital systems by the instant conversion to electricity. The present invention thus consists of three parts:

An electromagnetic heat engine, inductively converting power between heat in a magnetic medium and current in an electrical circuit.

The magnetic Carnot cycle consists of magnetizing a magnetic medium at one temperature and demagnetizing the medium at a different temperature. If the susceptibility of the medium drops with rising temperature, as is commonly the case, heat gets absorbed during demagnetization and released during magnetization. Appropriate heat transfers are therefore required to keep the temperature steady during each of these isothermal operations. The temperature changes are effected by adiabatic magnetization or demagnetization operations. Work is done on the medium during magnetization, and the medium performs work as it demagnetizes, but the work transfers are unequal because the susceptibility changes with the temperature. Performing magnetization cycles in synchronization with temperature cycles thus results in net conversion between heat and coherent power.

In the electromagnetic engine, the electric current does work in magnetizing the medium, and conversely, the medium does work on the electrical circuit by the induced emf during demagnetization. The engine thus converts between heat and electrical power. Since the induced emf is proportional to the current, the work done by the medium instantaneously appears as a negative resistance in the circuit. Correspondingly, magnetization induces a positive resistance in the circuit. The induced resistance also varies with the susceptibility, which depends on the instantaneous temperature, hence a net negative resistance is induced when operating as an engine.

The negative resistance is not merely incremental, as obtained, for instance, in tunnel diodes, but is obtained even when the current is d.c. The negative resistance form of the induced power permits regulation and control through an auxiliary electrical power source needed to setup the current. Useful conversion power densities using high susceptibility media and high operating speeds. Greater freedom in system design.

The work done per cycle by a heat engine is a direct fraction of the energy stored in the thermodynamic medium. The conversion power density is therefore directly proportional to the density of energy storage in the medium. Under practical operating conditions, gas engines are confined to a small range of power densities by the universal gas constant, and by the mechanical constraints on speed.

The magnetic energy density depends on the susceptibility of the medium. Available susceptibilities span several orders of magnitude, ranging from the weak paramagnetism of fifty five elements to the strong ferromagnetism of iron. The corresponding energy densities range from a few microjoules per $cm^3$ in many paramagnetic materials, to over 1 $J/cm^3$ per Tesla in gadolinium and dysprosium in their ferromagnetic states. The comparative figure for gases is about 40 $mJ/K$-$cm^3$ at ordinary pressures, and the range is limited to one order of magnitude.

The range of susceptibilities, the various forms of magnetism available, and a wide range of operating speeds, mean a greater freedom in system design. This freedom was not realized in prior art magnetic engines because of restricted attention to ferromagnetism and mechanical operation. Though higher power densities are available particularly when using ferromagnetism, the theory and the practical aspects of paramagnetism remained unexplored. With the negative resistance approach and inductive work transfer, electromagnetic engines are better suited to exploiting the entire gamut of magnetic characteristics.

Further, the operating frequency of electromagnetic heat engines is only limited by the speed of the temperature changes, making electromagnetic heat engines uniquely suitable for a particular application in modern technology, involving rapid local temperature changes at frequencies extending to several gigahertz.

Synchronous cooling of digital systems.

Dissipation in digital systems tends to be concentrated in bursts following clock edges that trigger the digital state transitions. An electromagnetic engine can therefore be constructed around a digital system, using a magnetic medium repeatedly heated by the bursts of dissipation. By synchronizing the engine current with the system clock, the current is made to build up inbetween bursts, when the medium is at a lower temperature, and is reduced during the bursts at the higher temperature caused by the dissipation. At least part of the dissipated heat thus gets converted to electricity.

The per-clock switching dissipation of a logic gate is quite small, and in practice only a few gates change states at any given clock edge in many circuits. The overall dissipation becomes significant primarily because of the high operating frequencies. Consequently, the per-cycle conversion power density required for the cooling is quite small, and the performance is limited by the efficiency rather than by the conversion density. Even the efficiency can be considerably higher than expected from the overall operating temperatures, because the conversion depends on the instantaneous temperature reached in the immediate vicinity of the transiting gates.

Other objects, features and advantages of the present invention will be apparent when the detailed description of the preferred embodiments are considered in conjunction with the drawings, which should be construed in an illustrative and not limiting sense as follows.

BRIEF DESCRIPTION OF DRAWINGS

FIG. 2b is a graph of the applied field versus the reciprocal of magnetization corresponding to the Carnot cycle shown in FIG. 2a.

FIG. 2c is a graph of the applied field versus magnetization corresponding to the Carnot cycle shown in FIG. 2a.

FIG. 8b is a side view of a hot heat exchanger for use in the electromagnetic turbine shown in FIG. 8a.

THEORY OF OPERATION

Theoretical background

Figure 1:
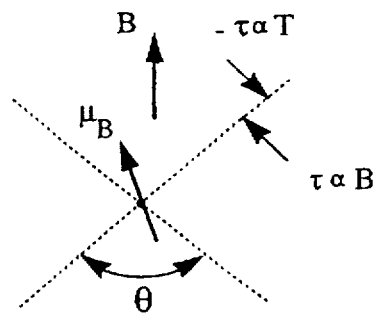
FIG. 1 is a diagram showing the angular freedom of the atomic magnetic moments restricted by the magnetic field applied to the electromagnetic engine in accordance with the invention.

The dynamical perception of magnetism has been so insufficient in the past that some researchers have indeed used the potential instead of the actual energy of magnetization [see Chapter 18, *Solid State Physics*, A J Dekker, Prentice-Hall, 1957], by associating the applied field B with the gas volume V, and the magnetization M, with the pressure p. This association is inappropriate because it ignores the fact that the thermal activity tends to gain orientational freedom for the elementary moments, so the magnetization, not the applied field, relates to a conceptual volume. The error is indicative of the theoretical difficulty in the prior art.

A simple kinetic theory of magnetization is indispensable for understanding and designing magnetic engines. Magnetization is the angular confinement of atomic moments by an applied field, and is analogous to the spatial confinement of a gas by walls that withstand its pressure.

Idealness, as in the term "ideal gas", means absence of significant internal interactions between the microscopic constituents. At low temperatures, interactions between atomic magnetic moments begin to dominate over the thermal activity, eventually causing the magnetization to condense around the Curie temperature. Ferromagnetism in general refers to the various condensed states of magnetization, while Curie law paramagnetism constitutes the ideal gas state.

Basic heat engine theory

In prior thermodynamic theory, the gaseous phase of matter describes the simplest linear relation between a pair of conjugate dynamical variables p and V:

$$pV = \text{constant}, \quad (1)$$

known as Boyle's law. The dynamical variables are conjugate in the sense that one represents a force and the other, a distance, such that while pdV defines a work differential, Vdp does not.

Thermo-dynamics results when such a pair of conjugate dynamical variables is related through an intensive property called the temperature, for then, the dynamical work for a given motion dV can be varied. An analytical relation of conjugate dynamical properties with the temperature is called the equation of state, and suffices to define a cyclic thermodynamic process.

The simplest equation of state is that of the ideal gas:

$$pV = rT, \quad (2)$$

where the constant r is the gas constant R=8.3144 J/K, times the number of moles of the gas. A very general equation of state would be the multinomial $$\sum_{i,j,k} c_{ijk} p^i V^j T^{-k} = \text{constant}. \quad (3)$$

The higher order terms in this form relate to interactions between the molecules.

The simplest cyclic process was first described by Carnot. The process theoretically confines the heat transfers to two given temperatures, and needs a pair of adiabatic operations to complete a cycle in the phase space. Adiabatic operations are described by the adiabatic equation, which takes the form $$pV^\gamma = \text{constant} \quad (4)$$

for the ideal gas, where γ is a ratio of specific heats. No net work is done by the two adiabatic operations, which simply translate the medium between equal temperature intervals. Equation (2) shows that the isothermal energy transfers are proportional to the respective temperatures:

$$\delta w_i = rT_i \delta(\ln V), \quad i=h, l, \quad (5)$$

where the subscripts h and l stand for the high and low temperatures, respectively. The net work per cycle is the difference of the isothermal energy transfers:

$$\delta w = r \delta T \delta(\ln V). \quad (6)$$

The local conservation of energy requires an energy transfer $\delta q_i$, called heat, exactly compensating for each work increment $\delta w_i$:

$$\delta w_i + \delta q_i = 0, \quad i=h, l, \quad (7)$$

because the internal energy does not change in isothermal operations on an ideal gas. For the same reason, all heat transfers are exactly equivalent to work increments of the same magnitude, so the theory and equations for Carnot cycles on an ideal gas are essentially dynamical, the only non-dynamical variable necessary being the temperature. The efficiency is therefore given by:

$$\eta_C \equiv \frac{\delta w}{-\delta q_h} = \frac{\delta w}{\delta w_h} = \frac{\delta T}{T_h}. \quad (8)$$

Carnot's theory and the second law guarantee that the same efficiency will hold for all Carnot cycles, irrespective of the idealness of their media.

With non-ideal media, the internal energy u is no longer constant during isothermal operations, for which the complete equation $$du = -dq - pdV$$

is required. The second law of thermodynamics requires that the corresponding entropy change ds=dq/T be an exact differential, hence the above equation leads to $$\frac{\partial u}{\partial V} = T \frac{\partial p}{\partial T} - p.$$

showing that in an isothermal operation, $$dq = -T \frac{\partial p}{\partial T} dV. \tag{9}$$

Magnetic engine theory

Even simpler isotherms and adiabatics are obtained in the analogous theory developed below for magnetic thermodynamic cycles.

We shall use Tesla as the common unit for both applied magnetic field B and magnetization H, so that the (volume) susceptibility $\chi \equiv M/B$ becomes a dimensionless ratio related to the relative permeability $\mu_r$ as $$\mu_r = \chi + 1,$$

and, further, the energy density of the fields can be compared directly. A strength of 1 T means $1/2\mu_0 \approx 397.89$ J/m³, whether it be of B or M. One may convert from Tesla to amperes per metre by dividing by $\mu_0 = 4\pi \times 10^{-7}$.

Paramagnetism occurs when the alignment of the atomic moments is determined by thermal activity, giving for the magnetization:

$$M = N\mu B_J \left( \frac{\mu B}{k_B T} \right), \tag{10}$$

where N is the number density of the atomic moments, $k_B$ is the Boltzmann constant, $B_J$ is the Brillouin function, and $\mu$ is the component of individual atomic magnetic moment along or against the applied field. The component $\mu$ is related to the total atomic magnetic moment as:

$$\mu = p\mu_B / \sqrt{3},$$

where p is the effective atomic magnetic moment in units of the Bohr magneton $\mu_B$. In weak fields, the magnetization is quite linear, adequately described by $$M = N\mu^2 B / k_B T. \tag{11}$$

B and M are conjugate dynamical variables because they involve the work $dw = -BdM/\mu_0$, where the negative sign reflects the fact that the work $BdM/\mu_0$ gets done on the medium in magnetization. They are evidently related via the temperature by equations (10) and (11), which therefore constitute the paramagnetic equations of state.

FIG. 1 shows that it is appropriate to associate B, the applied field, with the confining pressure (as in a cylinder with a piston), and $m \equiv M^{-1}$ with the confinement volume, ie. the angular freedom $\theta$ in the figure, since the atomic moments are unconfined ($m = \infty$)

In the figure, the applied field B causes an aligning torque $\tau = \mu_B \times B$, on the atomic moment $\mu_B$, so as to compress the latter's angular degree of freedom ($\theta$). Thermal interactions however tend to disrupt the alignment, tending to expand the angular distribution of the atomic moments. The effect is an expanding statistical torque $-\tau$ proportional to the temperature T. The equilibrium magnetization is a statistical balance between the aligning torque and this expanding "angular pressure".

Classical Langevin theory represents the aligning torque by its potential energy, and the "angular pressure", by the Boltzmann distribution. Both torques are replaced by transition probabilities in the quantum picture, with substantially the same physical results.

The association of B with pressure indeed conforms to dynamical considerations, for work is done on the medium by magnetization under constant applied field, $dw \propto -BdM$, but no work is done on the medium by increasing the applied field if the magnetization does not change, which happens when the medium is saturated, ie. MdB does not represent work. This compares with the theory of gases, in which pdV represents work but Vdp does not.

It helps to think of m as being similar to V, but the analogy is not exact because the incremental work is proportional to $-BdM$, not Bdm. The thermodynamics of magnetization follows from these dynamic variables.

Equation (11) may be rewritten as $$1/\chi = B/M = k_B T/N\mu^2 = kT, \tag{12}$$

where $k = k_B/N\mu^2$. This is known as the Curie law, usually written as $$\chi = \frac{C}{T},$$

where $C \equiv k^{-1}$ is called the Curie constant.

The adiabatic equation corresponding to equation (12) is derived next. The adiabatic condition requires that any work done on the medium should exactly equal the rise in its thermal energy content:

$$\frac{B}{\mu_0} dM = cdT = c/k \, (Bdm + mdB)$$

giving $$-kdm/\mu_0 cm^3 = (dm/m + dB/B)$$

or $$B/M = Ae^{kM^2/2\mu_0 c} = Ae^{\kappa M^2},$$

where c is the applicable heat capacity, $\kappa = k/2\mu_0 c$, and A is a constant of integration depending on the thermal energy density at any particular state:

$$A = kTe^{-\kappa M^2}.$$

The magnetic adiabatic equation is therefore:

$$1/\chi = B/M = kT_0 e^{\kappa(M^2 - M_0^2)}, \tag{13}$$

where $T_0$ and $M_0$ describe a reference point on the adiabatic.

In the B-M space, the Curie law isotherms form a family of straight lines through the origin, while the adiabatics are a family of parabolas that clearly intersect the isotherms, allowing one to define Carnot cycles. Note that the applicable heat capacity c is most likely to be $c_p$, because the medium would most likely be subject to a constant (atmospheric) pressure.

When B and M are both measured in Teslas, the applied field holds the energy density:

$$E = B^2/2\mu_0, \tag{14}$$

while that in the magnetization is:

$$U = BM/2\mu_0 = \chi E = E/kT. \tag{15}$$

U differs from the potential energy only in the sign. The total energy is:

$$U + E = \frac{B(M+B)}{2\mu_0} = (\chi + 1)E \equiv \mu_r E. \quad (16)$$

It is also useful to define a pseudo-energy $F \equiv M^2/2\mu_0$. The isothermal energy transfers integrate to:

$$\delta w_i = \delta U_i = h_i l_i \quad (17)$$

corresponding to equation (5) for a gas.

Figure 2A:
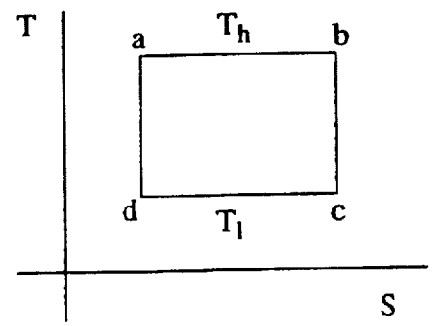
FIG. 2a is a graph of temperature versus entropy showing the Carnot cycle for a magnetic engine.
Figure 2B:
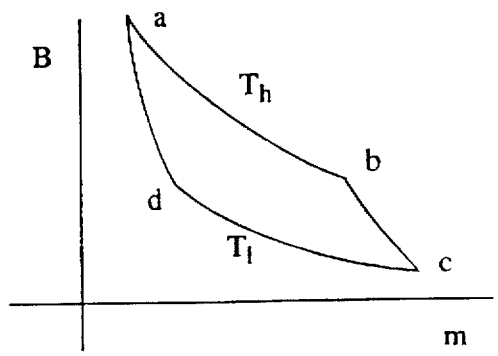
Figure 2C:
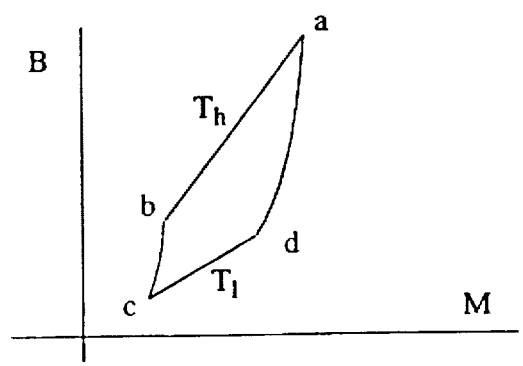

FIGS. 2a–c describe the magnetic Carnot cycle abcda working with non-zero magnetic fields.

FIG. 2a is the classical temperature-entropy (T-S) diagram of a heat engine working between the temperatures $T_h$ and $T_l$ ($T_h > T_l$).

FIG. 2b is the corresponding B-m diagram, which is similar to the p-V diagram of a gas Carnot cycle. The isotherms ab and cd are hyperbolae exactly as in the gas engine theory. The adiabatics bc and da differ from the gas theory, but are somewhat similar in form, since they intersect the isotherms. FIG. 2c is the equivalent B-M plot.

The cycle consists of isothermal demagnetization ab at the higher temperature $T_h$, adiabatic demagnetization bc lowering the temperature to $T_l$, isothermal magnetization cd at this lower temperature, and finally adiabatic magnetization da raising the temperature back to $T_h$.

The magnetic Carnot cycle can be operated in the reverse (adcba) to function as a refrigerator or a heat pump.

Equation (17) is insufficient to determine the cycle, since the isothermal energy transfers $\delta U_i$ are as yet unrelated. The common temperatures relate the ends of the adiabatic steps bc and da as:

$$\chi_a = \chi_b \text{ and } \chi_c = \chi_d.$$

By the adiabatic equation (13), these connectivity conditions are equivalent to:

$$M_a^2 - M_d^2 = M_b^2 - M_c^2.$$

Transposing terms leads to $$\delta F_l = \delta F_h = \delta F. \quad (18)$$

This is simply equivalent to the condition $$\delta M_l = \delta M_h = \delta M, \quad (19)$$

ie. the high and low temperature magnetization changes must be equal. The corresponding connectivity condition in gas engine theory is the equality of the volume ratios for the isothermal operations. The pseudo-energy F is clearly related to the paramagnetic entropy.

The last equation is equivalent to $$\chi_l \delta U_l = \chi_h \delta U_h, \quad (20)$$

giving $$\delta w_i = -kT_i \delta F, \quad i = h, l \quad (21)$$

From this, it is easy to show that the magnetic Carnot cycle has the same efficiency, equation (8), as the gas Carnot cycle. The work per cycle is:

$$\delta w = k \delta T \delta F = \eta_c \delta U_h. \quad (22)$$

It is helpful to note that $$\delta \chi = \frac{\delta T}{kT_h T_l} = \chi \frac{\delta T}{T_h} = \eta_c \chi. \quad (23)$$

Equation (21) means that the work transfer of larger magnitude occurs at the higher temperature, just as in a gas engine, even though the work transfers are reversed in direction. This does not affect the ability of magnetic engines to do work, however, as will be seen in the detailed description further below.

Equation (22) says that, for a given temperature difference, the power density of a magnetic engine using a paramagnetic medium is proportional to the susceptibility of the medium at the higher temperature. Comparison with equation (6) shows that the pseudo-energy $\delta F$ plays the same role as the compression factor $\delta(\ln V)$, but can vary by several orders of magnitude depending on the material.

Extension to ferromagnetism

As in the thermodynamics of gases, the Carnot efficiency also holds for non-ideal paramagnetism, which involves a non-zero interaction between the atomic moments.

The most important non-ideal paramagnetism is that associated with ferromagnetism, and is described by:

$$1/\chi \equiv B/M = \frac{k_B(T-\theta)}{N\mu^2} = k(T-\theta), \quad (24)$$

giving $$B = k(T-\theta)M,$$

where $\theta$ is called the Curie temperature. This is commonly written as the Curie-Weiss law:

$$\chi = \frac{C}{T-\theta}.$$

A variant of this law due to Néel is associated with antiferromagnetism, and has the form:

$$\chi = \frac{C}{T+\theta_N}, \quad (25)$$

where $\theta_N$ is the Néel temperature.

All forms of condensed magnetism reduce to paramagnetism at temperatures above the respective Curie temperatures. Provided the specific heat c remains largely constant, the magnetic adiabatic equation (13) and the connectivity conditions (18)–(20) continue to hold. The adiabatics are the family of parabolas in the B-M space as in Curie law paramagnetism, and the isotherms are again straight lines, though no longer passing through the origin.

The isothermal involvement of the internal energy u follows from the association of pressure p with $-B/\mu_0$ and volume V with M in equation (9), giving $$dq = \frac{T}{\mu_0} \frac{\partial B}{\partial T} dM = \frac{kT}{\mu_0} M \, dM,$$

hence $$\delta q_i = kT_i \delta F, \quad i = h, l. \quad (26)$$

The work transfers are directly integrated from equation (24) as $$\delta w_i = \delta J - BdM/\mu_0 = -k(T_i - \theta)\delta F, \qquad (27)$$

and the internal energy changes are $$\delta u_i = -\delta q_i = \delta w_i = -k\theta \delta F. \qquad (28)$$

Clearly, the same work is obtained per cycle as with the Curie law material, and at the same efficiency, but using smaller work transfers. The Néel law is equivalent to the Curie-Weiss law with a negative $\theta$, so antiferromagnetism merely requires larger work transfers. In electrical terms, a ferromagnetic medium appears to be less reactive, and an antiferromagnetic medium, more reactive, than a paramagnetic medium performing the same work per cycle.

The Curie constants for the paramagnetic elements listed in Table 1 further below are generally less than unity, except for dysprosium (18.75K) and gadolinium (41K). Cohesive interaction between the atomic moments lead to much higher effective C, of the order of $10^3$ in superparamagnetic media, for which the Curie law takes the form $$k = \frac{k_B}{\frac{\pi}{18}\phi M_d^2 d^3}, \qquad (29)$$

where d is the average diameter of the ferromagnetic particles, $M_d$ is the domain magnetization, and $\phi$ is the volume fraction of the solid present [chapter 2.7, *Ferrohydrodynamics*, R Rosensweig, Cambridge University Press, 1985]. The increased C is due to the larger constituent magnetic moments, because the liner the particles, the lower is the (initial) susceptibility obtained.

Rosensweig also derives the efficiency of a magnetic engine cycle operating entirely under saturation just below $\theta$ where the intrinsic domain magnetization drops linearly to zero with rising T. [chapter 6, *Ferrohydrodynamics*]. As in the prior art, the treatment given by Rosensweig is specific to saturation magnetization, approximated over the operating range by $$M_{sat} = K(\theta - T). \qquad (30)$$

The engine cycle is necessarily non-Carnot, so a regenerative mechanism is proposed to restore the efficiency. The engine is also restricted to mechanical work transfers, since a superconducting magnet is required for maintaining a saturating field.

A more general theory using the same approximation is developed below for the electromagnetic engines. Since the work must extracted through the magnetizing current, the applied field cannot be maintained at saturation, but must vary with the electrical load. Following standard engineering practice, the ferromagnetic behavior is approximated by an initial susceptibility, assumed to be proportional to the domain magnetization, to obtain the linear ferromagnetic equation of state:

$$B/M = -\frac{k}{T-\theta} \equiv -\frac{1}{C(T-\theta)}, \qquad (31)$$

where C is the equivalent "Curie constant" for the modified Curie-Weiss law $$\chi = -\frac{T-\theta}{k} = -C(T-\theta).$$

Figure 2D:
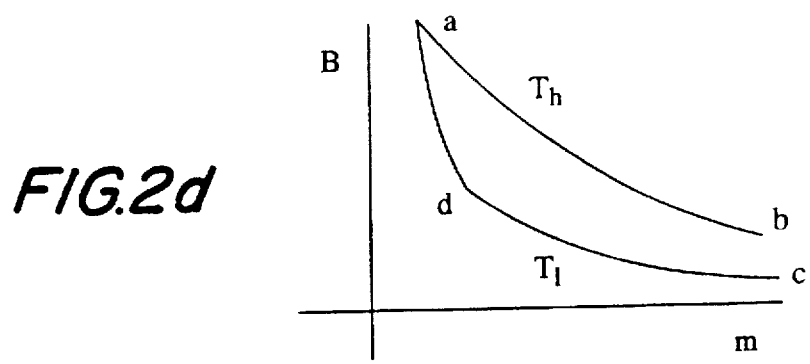
FIG. 2d is a graph of the applied field versus the reciprocal of magnetization showing the Carnot cycle for an electromagnetic engine in accordance with the invention.
Figure 2E:
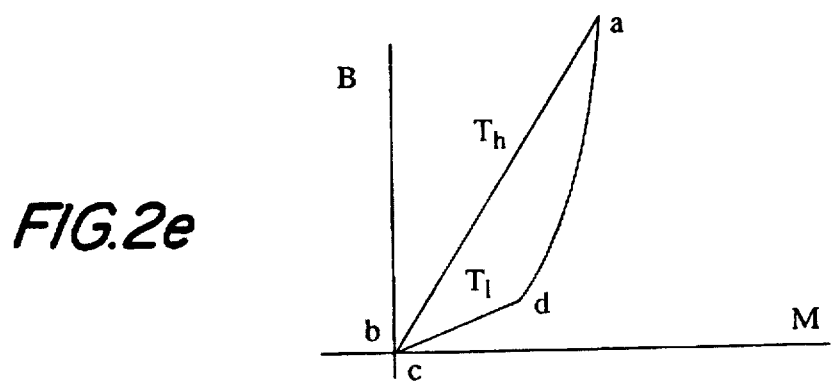
FIG. 2e is a graph of the applied field versus magnetization showing the Carnot cycle for an electromagnetic engine in accordance with the invention.
Figure 2F:
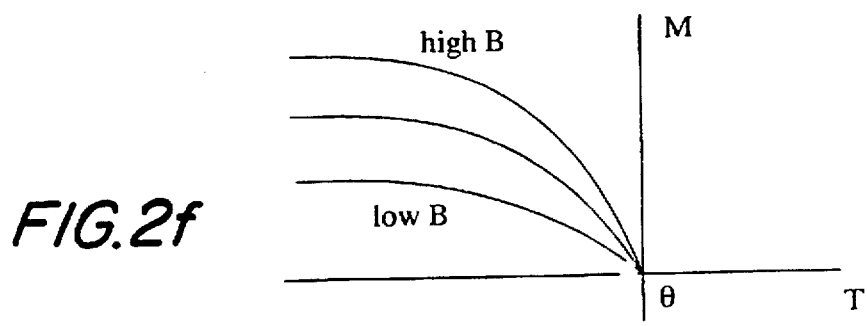
FIG. 2f is a graph of the magnetization versus temperature for various applied field strengths on a linear ferromagnetic medium.

FIG. 2f shows the variation of magnetization with temperature under non-saturating applied fields. For consistency, the applied field is still designated as B, though, particularly when dealing solely with ferromagnetism, one usually uses the letter H.

The corresponding linear ferromagnetic adiabatic equation follows from:

$$dT = d(\theta - kM/B) \qquad (32)$$

giving $$\frac{B}{\mu_0}dM = ck\left(\frac{dM}{B} - \frac{MdB}{B^2}\right)$$

$$\frac{dM}{M} = \frac{dB}{B(1 - B^2/kc\mu_0)}$$

$$\ln M = \text{constant} + \frac{1}{2}\ln\left|\frac{B^2}{1 - B^2/kc\mu_0}\right|$$

or $$B/M = A\sqrt{1 - B^2/kc\mu_0},$$

which would reduces to the constant A, and thus to the isothermal form, if the second order term in the square root were to vanish. The adiabatics clearly intersect the isotherms, and Carnot cycles can once again be defined.

Figure 2G:
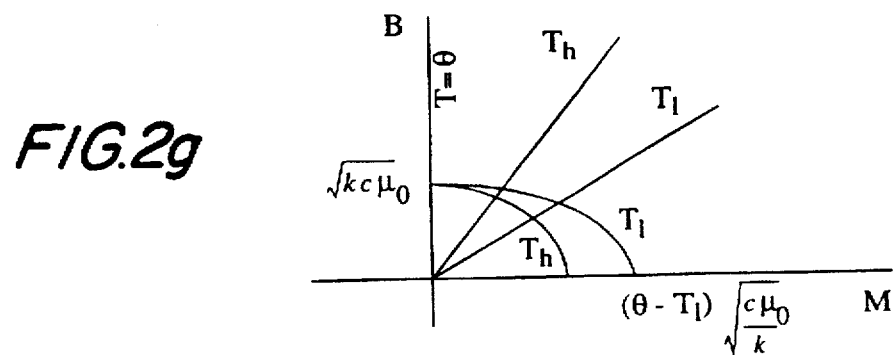
FIG. 2g is a graph of the applied field versus the magnetization, showing the isotherms and adiabatics in a linear ferromagnetic medium.

In the B-M space, the linear ferromagnetic isotherms are again straight lines through the origin, while the adiabatics are ellipses centered on the origin, intersecting the B axis (T=$\theta$) at B=$\sqrt{kc\mu_0}$, and the M axis at M=$(\theta-T)\sqrt{c\mu_0/k}$, as shown in FIG. 2g.

Equation (32) leads to the connectivity condition $$\frac{M_a}{M_d} = \frac{M_b}{M_c}, \qquad (33)$$

or equivalently, $$\frac{F_a}{F_d} = \frac{F_b}{F_c}, \qquad (34)$$

and the ratio should be completely determined by the temperature range for the Carnot cycle. The connectivity condition is clearly more like that for gas engines, unlike the condition for paramagnetism, equation (18).

The work transfers integrate to $$\delta w_i = -\frac{k\delta F_i}{T_i - \theta}, i = h, l, \qquad (35)$$

but the $\delta F$s differ. The isothermal heat transfers are as follows:

$$dq = \frac{T}{\mu_0}\frac{\partial B}{\partial T}dM = -\frac{T}{T-\theta}\frac{BdM}{\mu_0}, \qquad (36)$$

or $$\delta q_i = \frac{T_i}{T_i - \theta}\delta J - \frac{BdM}{\mu_0} = \frac{T_i}{T_i - \theta}\delta w_i,$$

giving for the internal energy changes $$\delta u_i = -\frac{2T_i - \theta}{T_i - \theta} \delta w_i. \quad (37)$$

Since cyclic operations cannot change the internal energy, the net work per cycle $\delta w = \delta w_h - \delta w_l$, and the net heat transfer per cycle $\delta q = \delta q_h - \delta q_l$, must be equal and opposite. Appropriate algebraic manipulation of equations (34) through (36) results in the condition $$\frac{\delta F_h}{\delta F_l} \equiv \frac{\delta F_b - \delta F_a}{\delta F_c - \delta F_d} = \frac{(T_h - \theta)^2}{(T_l - \theta)^2}, \quad (38)$$

giving $$\delta w = \frac{k\delta T\delta F_l}{(T_l - \theta)^2} = \frac{k\delta T\delta F_h}{(T_h - \theta)^2}.$$

This can be further reduced, using the modified Curie law (31), to $$\delta w = -\frac{\delta T\delta U_l}{T_l - \theta} = -\frac{\delta T\delta U_h}{T_h - \theta}. \quad (39)$$

If $T_h$ be quite close to $\theta$, $\delta T$ would be almost the same as $\theta - T_l$, so ideally the entire $\delta U_l$ becomes available. Since ferromagnetic media are easily magnetized to saturation, the saturation energy density can be conveniently assumed to be the maximum work per cycle.

The theory for more complex magnetic equations of state, including non-linear behavior below or across the Curie temperature, can be derived analogously. For example, in some materials, such as ferrites, the susceptibility distinctly rises with the temperature a little below the Curie point, so the heat transfers become reversed in direction when operating over such temperature ranges. The theory however remains substantially the same, and an electromagnetic engine can be operated between any two temperatures that yield different susceptibilities.

Susceptibility and power density

It remains to explore the power densities actually realizable from the various forms of magnetism.

Linear paramagnetic susceptibilities are limited, from equation (11), by the numerical density of atoms, N, and the square of the effective atomic moment μ. Though neither N nor μ can vary by more than an order of magnitude, the variation of μ leads to large variations in magnetic behavior.

Table 1 contains a short list of the (volume) susceptibilities χ, with the corresponding energy densities U, of several paramagnetic elements, computed from handbook cgs molar values using the relation $$\chi = 4\pi \times 10^{-6} \chi_m \rho / M,$$

where M is the molar weight ($10^{-3}$ kg), ρ is the density ($10^{-3}$ kg/m$^3$), and $4\pi \times 10^{-6}$ converts the cgs mass susceptibility (in cm$^3$/mole) to SI units (m$^3$/mole).

TABLE 1

| | Susceptibilities | | | | |
|---|---|---|---|---|---|
| | $\chi_m$ ($10^{-6}$) | ρ | M | $\chi$ ($10^{-6}$) | U μJ/T-cm$^3$ |
| Al | 17 | 2.7 | 27 | 21 | 8 |
| Cr | 180 | 7.2 | 52 | 313 | 125 |
| Dy | 98k | 8.5 | 163 | 64k | 26k |
| Gd | 185k | 7.9 | 157 | 117k | 46k |
| Mg | 13 | 1.7 | 24 | 12 | 5 |
| Mn | 529 | 7.4 | 55 | 900 | 358 |
| Pd | 567 | 12.0 | 106 | 804 | 320 |
| Pt | 202 | 21.5 | 195 | 279 | 111 |
| Ti | 153 | 4.5 | 48 | 179 | 71 |

($k \equiv 10^3$, gadolinium data at 350K)

The table lists the total susceptibilities, including the inherent diamagnetism and the temperature-independent electron paramagnetic contributions in metals. Only the temperature-dependent paramagnetic component is useful to thermodynamics, which means that the effective values are likely to be somewhat different. The numbers however serve to illustrate the magnitudes involved.

Vacuum represents a temperature-independent capacity of $E = \frac{1}{2}\mu_0 \approx 400$ kJ/T-m$^3$ or 400 mJ/T-cm$^3$. Air incidentally has a paramagnetic susceptibility, due to its oxygen content, of about $1.4 \times 10^{-7}$, so air adds 56 nJ/T-cm$^3$ to the capacity. The mechanical power of an "air-cored" magnetic engine would therefore be quite undetectable. For example, the air flow in an aircraft jet engine is of the order of 100 m$^3$/sec, representing only 5 W/T of magnetic storage capacity.

Gases have energy densities of the order of 831.44/$22.414 \times 10^3 = 37$ mJ/K per cm$^3$ at ordinary pressure and temperature. The rare earth elements have per Tesla magnetic energy densities of the same order: 26 mJ in dysprosium and 46 mJ in gadolinium.

Practical operating temperature ranges are in hundreds of degrees, so the limit on gas engine power density is actually of the order of 3.7 J/cm$^3$ or 185 kW/litre at 50 Hz operating frequency. This number must be further scaled up by the log of the compression ratio, according to equation (6). Throughputs of the order of 150 kW/litre are actually obtainable.

Practical applied field variations can usually be no more than 0.1 T (about 80 kA/m), and further the operating temperature difference does not factor into the throughput with the energy density, according to equation (22). This means a maximum power density of only about 130 W/litre using dysprosium or 230 W/litre using gadolinium at around 60° C.

Magnetic engines using linear paramagnetism would clearly have to operate at least 1000 times faster to yield power densities comparable to gas engines. This is not a serious problem for electromagnetic engines, whose operating speed is limited only by the circuit time constants and the relaxation rate of the magnetism, which is very high in the case of linear paramagnetism.

Saturation energy densities at a hypothetical 1 T applied field are listed in Table 2 below. The applied field actually required for saturation varies with the material. For example, in soft iron at ordinary temperatures, the initial susceptibility is of the order of 10,000, suggesting onset of saturation at a mere 0.2 mT (160 A/m). Higher applied fields are actually required because the susceptibility diminishes as saturation is approached.

The easier saturation in the ferromagnetic regime, means that the saturation energy densities do become pg.27

TABLE 2

| Saturation energy densities | | |
|---|---|---|
| | $M_{sat}$ (T) | $U_{sat}$ (J/T-cm$^3$) |
| Dy | 3.67 | 1.46 |
| Gd | 2.59 | 1.03 |
| Ni | 0.64 | 0.25 |
| Mg | 0.56 | 0.22 |
| Fe | 2.18 | 0.87 |
| Co | 1.82 | 0.72 | available at the same O(0.1 T) applied field variations, when operating at temperatures below the respective Curie temperatures. Thus, soft iron can yield 0.087 kJ/litre, or over 4 kW/litre at 50 Hz. To compare, dysprosium can convert 0.146 kJ/litre or over 7 kW/litre at 50 Hz, so the difference is not much. A 0.1 T applied field corresponds to about 100 turns/cm at 8 A load current. The soft iron engine would therefore be contributing 500 V, at an effective negative resistance of 62.5 Ω. At 10 turns/cm and the same load current, the engine power would reduce to 400 W, the voltage, to 50 V, and the effective negative resistance would be only 6.25 Ω.

If the applied field ("ampere-turns") can be raised, possibly by using superconducting wires, to 1 T say (approximately 800 kA/m), the soft iron engine would produce about 40 kW/litre. For comparison, paramagnetic gadolinium would still be limited to under 2.3 kW/litre at this applied field intensity.

Ferromagnetism is clearly advantageous in terms of power density, which cannot be raised further merely by using superparamagnetic media, which have the same saturation as the bulk ferromagnetic materials from which they are derived. Higher power densities can still be obtained by increasing the operating speed. A 0.1 T applied field variation corresponds to about 40 W/litre-Hz per Tesla of saturation magnetization.

Ferrofluid relaxation speeds are better than 100 ns, or 10 MHz, at under 10 nm particle size, so a 1 MHz operation is feasible from standpoint of the medium itself, which sets an upper bound of about 40 MW/litre per Tesla of saturation. The speed would be generally limited by the heat transfers, though the temperature of the medium is ideally changed by the adiabatic operations. In applications like synchronous cooling, where high speed heat input is not a problem, it is indeed possible to drive electromagnetic engines at microwave frequencies using paramagnetic media.

In general, reciprocating electromagnetic engines are largely limited in power density by the realizable speed of thermal diffusion. This limitation is somewhat alleviated in turbine design, in which the heat transfer is effectively speeded up by the motion of the medium through the active portions of the engine. This comparison is equally valid for gas engines.

Negative resistance generation theory

Figure 3:
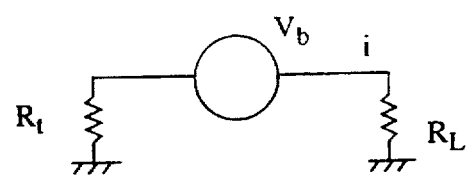
FIG. 3 is a circuit diagram of an equivalent circuit to a negative resistance device, such as an electromagnetic engine in accordance with the invention.

A negative resistance is a useful form of power generation, though it needs an auxiliary source to setup the load current. Consider an electrical circuit containing just the auxiliary voltage source $V_b$ and a load resistance $R_L$. The current in the circuit would be $i_b = V_b/R_L$, and the power flow is $P_b = V_b^2/R_L$. These base values are modified when a resistive device $R_r$ is introduced into the circuit as shown in FIG. 3.

In the figure, $R_L$ represents the total electrical load, $V_b$ is the voltage due to the auxiliary source, i is the load current, and $R_r$ is the equivalent resistance of the device. When the device is not operating, $R_r = 0$, so the load current is $i = V_b/R_L$. When the device supplies electrical power to the circuit, $R_r$ becomes negative, and the load current becomes $V_b(R_r+R_L)$ $> V_b/R_L$.

For a given voltage $V_b$, the device resistance changes the current to $$i = \frac{V_b}{R_L + R_r} = \beta i_b \qquad (40)$$

where $$\beta = \frac{1}{1-\alpha} \text{ and } \alpha \equiv -\frac{R_r}{R_L} = 1 - \frac{1}{\beta}. \qquad (41)$$

The power drawn from the auxiliary source also changes by the same factor β:

$$P_{i \to \beta i_b} V_b = \beta P_b. \qquad (42)$$

However, the load power changes much more:

$$P_o = i^2 R_L = \beta^2 P_b = \beta P_i. \qquad (43)$$

The factor β is thus the power gain caused by the resistive device. Correspondingly, α may be called the cohesion factor, for it represents power brought in, rather than being dissipated, by the device. If α<0, the device is dissipative and drains power, while a positive α means the device is adding power to the circuit.

It is easy to show that the power due to the negative resistance is $$P_r = P_o - P_i = (\beta - 1)P_i = \alpha P_o. \qquad (44)$$

Also, the voltage $V_L$ seen by the load is $$V_L = iR_L = \beta V_b, \qquad (45)$$

showing that the voltage delivered to the load is also magnified by the gain β. For the load voltage to remain constant, $V_b$ must be reduced as the β increases.

Figure 4:
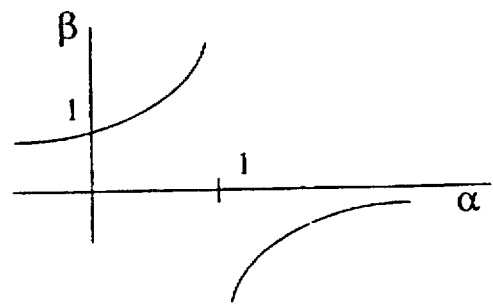
FIG. 4 is a graph of power gain due to electrical power output by a negative resistance device versus a normalized effect on the circuit due to the device.

FIG. 4 shows how the gain and the cohesion can vary with the device $R_r$. As α tends to unity, the load power is almost totally supplied by the device. A vanishing device resistance $R_r = 0$ is represented by β=0, β=1.

Electrical loads are dissipative, including motors, heat pumps and refrigerators, and a dissipative device is characterized by the region α<0, $R_r$>0.

Negative resistance devices must operate in the region 0<α<1, β>1, since they must mean additional power to the load circuit. Equations (40) and (42) show that more power is also drawn from the auxiliary source by the factor β.

For example, consider a load resistance $R_L=10$ Ω, and an auxiliary source of 10 V. The base value current $i_b$ is then 1 A, and the base value load power is 10 W. Introducing a device of −7.5 Ω shifts the circuit to α=+0.75, β=4. The current rises to 4 A, so the auxiliary source now sources 40 W. The load however gets 160 W, so the circuit gains 120 W from the negative resistance device. The load sees 40 V, of which only 10 V is from the auxiliary source and 30 V is due to the negative resistance.

Consider what happens if the auxiliary source is a current source instead, driving exactly 10 A through the same load $R_L$. When $R_r$ is inserted into the circuit, the current source holds the current down to 10 A, but only needs to put in $V_b/\beta=2.5$ V to sustain the current. The load power $P_o$ does not change, but only 2.5 W now comes from the auxiliary source, and the remaining 7.5 W comes from the negative resistance. The load still sees 10 V, but only 2.5 V now comes from the auxiliary source, and 7.5 V is from the negative resistance.

The infinite gain at $\alpha=1$ is equivalent to taking zero power from the auxiliary source, and all the load power should come from the negative resistance device, as indicated by equation (44). Over unity $\alpha$ would mean that the device supplies power to the auxiliary source as well. Clearly, neither of these modes of operation can occur with electromagnetic engines.

The delivered power comes from the auxiliary source and the negative resistance device, so both inputs are means of controlling the delivered voltage:

$$\frac{\partial V_L}{\partial V_b} = \beta \text{ and } \frac{\partial V_L}{\partial R_r} = \beta i, \quad (46)$$

and power:

$$\frac{\partial P_o}{\partial V_b} = 2\beta i \text{ and } \frac{\partial P_o}{\partial R_r} = 2\beta i^2. \quad (47)$$

The sensitivity of the overall system to fluctuations in the load resistance is easily derived from the above.

Electromagnetic engine theory

The dynamical variables B and M directly interact with electric currents, allowing a direct coupling of the electrical and thermal energies. The direct coupling distinguishes electromagnetic engines from the prior art magnetic engines using electromagnets, including cryogenic magnetic refrigerators, in which the work per cycle is purely mechanical.

An electric current does work in magnetizing a medium. Conversely, demagnetization induces electrical energy into the magnetizing circuit, in the form of a back-emf. It has been noted before that in adiabatic demagnetization, the atomic moments in the medium do work on the withdrawing field as they demagnetize [Feynman, in *Lectures*, Vol. II, section 35-5]. The demagnetization is thus limited by the speed of thermal relaxation, which is however sufficiently fast for engine applications. Actually, even the magnetization is limited by the thermal relaxation, which makes the thermal dependence symmetric. Other magnetic issues, such as the energy of the applied field, the diamagnetism of all materials, and hysterisis effects of various components and neighboring materials, are not directly concerned with the thermodynamics of the electromagnetic engines.

FIGS. 2d and 2e show the magnetic Carnot cycle more suited to the electromagnetic engines. Since the magnetization is due to an electric current, which can reduce to zero cyclically, especially when using a.c., the Carnot cycle of FIGS. 2b and 2c must be modified to include the zero magnetization. The corner points b and c are moved to $m=\infty$ in FIG. 2d, and to the origin, $M=0$, in FIG. 2e. Note that the graphs ignore the signs of the variables, otherwise a symmetric third quadrant would be needed to show both phases in a.c. operation.

The instantaneous emf due to magnetization or demagnetization caused by the current i in a coil, is given by $$\xi = -N\dot{\phi}_M = -L_M di/dt, \quad (48)$$

where N is the number of turns in the coil, $\phi_M$ is the rate of change of the magnetization part of the total flux, and $L_M$ is the magnetization part of the inductance, defined next. A magnetic circuit of effective length l and effective cross sectional area A has the reluctance and inductance $$R = \frac{l}{\mu_0(\chi+1)A} \text{ and } L = \frac{N^2}{R}, \quad (49)$$

respectively. The magnetization contributes $$R_M = \frac{l}{\mu_0 \chi A} \text{ and } L_M = \frac{N^2}{R_M}, \quad (50)$$

while the applied field relates to $$R_0 = \frac{l}{\mu_0 A} \text{ and } L_0 = \frac{N^2}{R_0}, \quad (51)$$

respectively, giving $$R^{-1} = R_M^{-1} + R_0^{-1} \text{ and } L_M = \chi L_0. \quad (52)$$

This allows us to handle the magnetization energy $L_M i^2/2$ independently from that of the applied field, $L_0 i^2/2$.

The instantaneous power flow to and from the medium is $i\xi$, and can be characterized by an instantaneous resistance $R=\xi/i$. Since the temperature changes between the magnetization and the demagnetization operations, the induced emfs, and the corresponding induced resistances, are unequal in magnitude. The mean resistance $R_i$ over a complete thermodynamic cycle is therefore non-zero, relating to net conversion of power.

The magnetization and demagnetization energy transfers are $$\delta w_l = L_l i_l^2/2 \text{ and } \delta w_h = L_h i_h^2/2$$

respectively, where $i_l$ is the current magnitude reached during the magnetization, $i_h$ is the magnitude reached in demagnetization, and $L_l$, $L_h$ are the inductances $L_M$ due to the magnetization at the temperatures $T_l$ and $T_h$ respectively. Equation (20) means that $$i_l = \frac{T_l}{T_h} i_h, \quad (53)$$

when using linear paramagnetism, which means that $i_h$ is the larger value. FIG. 2e shows that this is also the likely peak current, so with the help of equation (22), the work per cycle can be written as $$\delta w = \eta_c \delta U_h = \eta_c L_h i_h^2/2 = f \eta_c L_h i_{rms}^2, \quad (54)$$

where $f$ is a form factor that depends on the current waveform. Small deviations from the Carnot cycle and other losses of efficiency can be bundled into the factor $f$, so the equation is of a general form.

The mean resistance $R_r$ would be $$R_r i_{rms}^2 = v \delta w \quad (55)$$

where v is the operating frequency of the engine, ie. the number of thermodynamic cycles per second, giving $$R_r = v \frac{\delta w}{i_{rms}^2} = v f \eta_c L_h. \quad (56)$$

By the ordinary sign convention, a positive resistance represents a drain of electrical power, hence the net induced resistance of an electromagnetic engine operating as a refrigerator or heat pump, is positive, appearing as a load to the magnetizing circuit. When operating as an engine, the induced resistance is negative, since it adds power to the circuit.

DETAILED DESCRIPTION OF PREFERRED EMBODIMENT

Figure 5A:
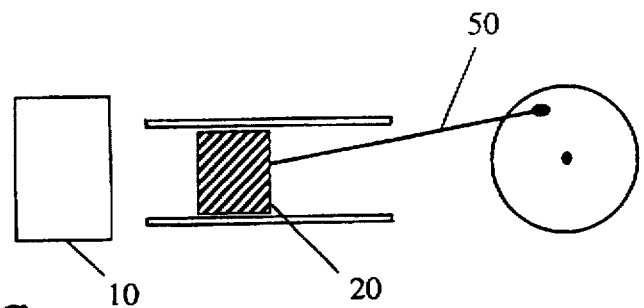
FIG. 5a is a schematic diagram of a reciprocating magnetic heat engine.
Figure 5B:
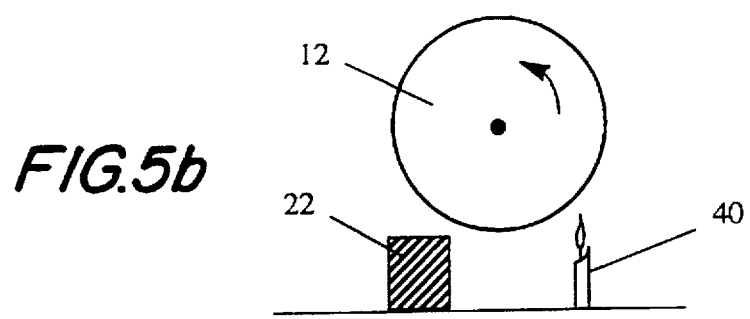
FIG. 5b is a schematic diagram of a conventional low power heat driven magnetic motor.
Figure 5C:
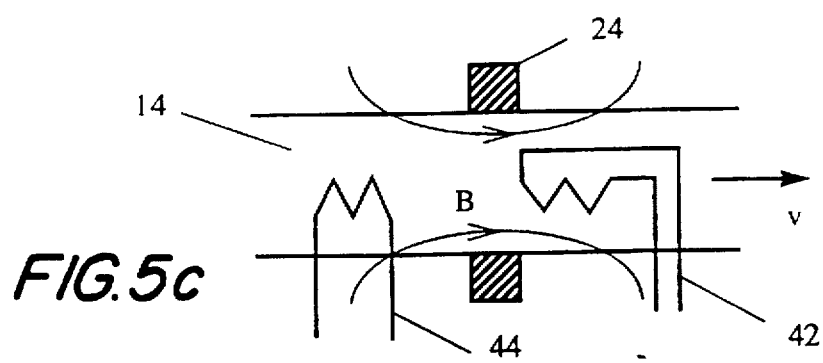
FIG. 5c is a schematic diagram of a conventional magnetic turbine.

FIGS. 5a–c describe mechanical heat engines using magnetism, while FIGS. 6a–g describe the corresponding electromagnetic forms that can convert heat directly to electricity. The reference numerals used in these drawings are listed in Table 3 below.

Description of magnetic engines

A simple reciprocating engine is shown in FIG. 5a, in which a magnet (20) is constrained to move cyclically over a limited distance from a magnetic medium (10) by a crankshaft attachment (50). The engine is analogous to a conventional gas engine, with the magnet (20) serving as the piston. The medium becomes magnetized when the magnet approaches it, and demagnetizes as the magnet recedes. The medium is thermally isolated for the adiabatic steps, and heated and cooled in the isothermal steps, by means not shown in the figure, in synchronization with the motion of the magnet (20).

As the magnet (20) approaches the medium (10), the medium gets magnetized and tends to warm up. The medium is simultaneously cooled to maintain the temperature, and its entropy decreases. This corresponds to the isothermal magnetization cd in FIGS. 2b and 2c. In the adiabatic portion da, the medium is thermally isolated while being magnetized further, so its temperature rises from $T_l$ to $T_h$. The isothermal demagnetization ab is then performed by adequately heating the medium as the magnet is withdrawn. In

TABLE 3

| Reference numerals | | |
|---|---|---|
| # | Denotes | Figures |
| 10 | magnetic medium | 5a,6a,b |
| 12 | wheel with paramagnetic rim | 5b |
| 14 | moving magnetic medium | 5c,6f,g |
| 20 | permanent magnet "piston" | 5a |
| 22 | stationary magnet | 5b |
| 24 | annular magnet in turbine | 5c |
| 26 | magnet to propel medium | 6f |
| 30 | magnetizing coil | 6a,b |
| 32 | magnetizing coil in turbine | 6f |
| 34 | magnetizing coil in cascade | 6g |
| 40 | heat source (candle) | 5b |
| 42 | heat exchanger (hot) | 5c,6f |
| 44 | heay exchanger (cold) | 5c,6f |
| 46 | a heating element | 6g |
| 50 | crankshaft | 5a | the segment bc, the medium is not heated while the magnet continues to recede, so the demagnetization drops the temperature back to $T_l$.

In the traditional gas engine, the high temperature heat intake does work against the mechanical load, while the flywheel action of the crankshaft mechanism must do work on the medium during the low temperature compression. The net work of the gas engine is thus done in the outward movement of the piston.

Flywheel action is likewise involved in the magnetic engine, though the direction of the mechanical forces is reversed from a gas engine. The low temperature inward motion converts some of the field energy in the space between the magnet and the medium into kinetic energy of the flywheel. The flywheel supplies the work in the high temperature outward motion. Only part of the flywheel energy returns to the field, because of the lower susceptibility at the higher temperature. The remainder is available to operate a mechanical load. Heat is thus converted first into magnetic field energy and then to mechanical power in the magnetic engine.

Particularly at higher power densities, the flywheel action alone may be insufficient to transfer the field energy to the load. High field energy density means strong attraction between the magnet and the medium.

A mechanical spring appropriately connected to the magnet, or compressed gas between the magnet and the medium, may be used to reduce the net attraction and ease the outward motion. Indeed, the gas may be used thermodynamically as well, for additional conversion of heat within the same system.

It also helps conceptually to think of the field energy as equivalent to the confined gas in a gas engine. The outward motion of the piston allows this field energy "gas" to expand and absorb heat, while the inward motion compresses the "gas" and releases heat at the lower temperature.

FIG. 5b shows a non-reciprocating engine, a simple "magnetic turbine", in the sense that the working medium moves continuously, with the various thermodynamic steps occurring simultaneously in different parts of the system. A wheel (12) with a paramagnetic rim constitutes the stator, and a magnet (22) applies a magnetic field over part of the rim as shown. A heat source (40), a candle say, warms the rim close to the magnet. Since the magnetic susceptibility decreases with temperature, the warmed portion of the rim is less attracted to the magnet (22) than the cooler region on the other side of the magnet. The differential susceptibility results in a torque, which causes the wheel to spin in the direction shown, from the magnet to the heat source. This thermodynamic conversion of heat to kinetic energy of the medium is used in magnetocaloric power generation.

Since the rim is not specially cooled to maintain the lower temperature as it approaches the magnet (22), this simple turbine deviates significantly from the Carnot cycle and has a much lower efficiency.

A variant of this design uses a wheel with a ferromagnetic rim. The heating must be sufficient to reach the Curie temperature (770° C. for iron, 20° C. for gadolinium) above which the rim becomes paramagnetic, thus providing a large change in susceptibility.

A more general magnetic turbine using magnetism is shown in FIG. 5c, in which an annular magnet (24) produces a concentrated axial field. A magnetic medium (14) moves axially through this field at a speed v as shown, propelled by magnetocaloric effect. A heat exchanger (42) maintains the medium at the higher temperature $T_h$ for some distance as it moves out of the magnet, to cause approximately isothermal demagnetization. Beyond the heat exchanger, the medium continues to demagnetize adiabatically. A second heat exchanger (44) maintains the medium at the lower temperature $T_l$ for some distance before it reaches the magnet, causing almost isothermal magnetization.

Between the exchanger (44) and the magnet (24), the medium continues to magnetize adiabatically. A non-Carnot cycle is always less efficient, so operation as close as possible to the Carnot cycle is always desirable, which means that the temperature changes must be completed entirely in the adiabatic portions, and the passage through the heat exchangers must be isothermal. The two heat exchangers are appropriately shaped and positioned relative to the magnet (24) for this purpose, since the heat transfers must be proportional to the respective rates of magnetization or demagnetization.

The magnetic turbine of FIG. 5c is analogous in structure to a gas turbine, in which air (the medium) is compressed (magnetized) as it enters and expands (demagnetizes), providing thrust (magnetocaloric effect), at the exhaust at a higher temperature.

Description of electromagnetic engines

Figure 6A:
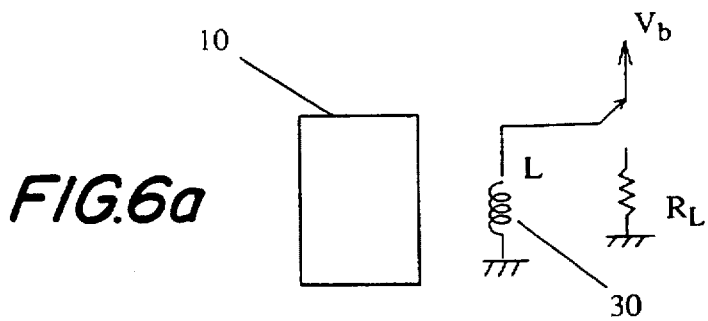
FIG. 6a is an electrical circuit diagram showing a simple reciprocating electromagnetic engine using a voltage source for magnetizing a magnetic medium.
Figure 6B:
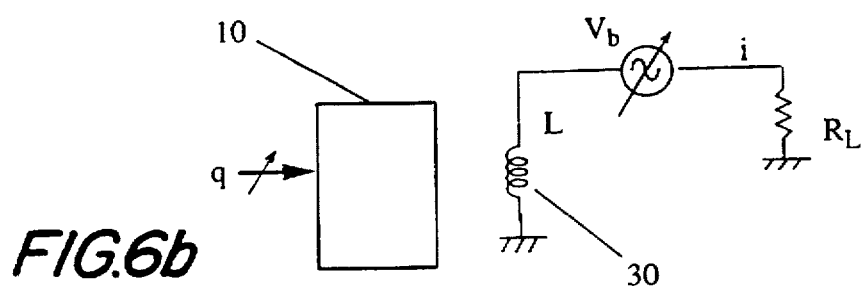
FIG. 6b is an electrical circuit diagram showing a simple electromagnetic engine which uses a.c. excitation together with temperature cycling.

FIGS. 6a–b show that electromagnetic engines involve two power inputs, a heat supply q and an auxiliary electrical source $V_b$, which can both be varied to regulate and control the load power.

In FIG. 6a is shown a simple reciprocating electromagnetic engine consisting of the working magnetic medium (10), which is magnetized by a coil (30). The coil is connected by a switch alternately to an auxiliary source of voltage $V_b$ and to a load resistance $R_L$. When connected to the auxiliary source, an electric current builds up in the coil and magnetizes the medium. When the coil is switched to the load, the medium demagnetizes by dissipation in the load. As in the engine of FIG. 5a, the medium must also be heated, cooled or isolated by an external means to effect the thermodynamic operations.

It is useful to note that the Carnot cycle does not require the temperature of the medium to be changed by thermal means, because the temperature changes are ideally performed by the adiabatic operations. Heat transfers in the Carnot cycle are ideally isothermal. It therefore suffices to provide a thermal switching means to place the medium in thermal contact alternately with high and low temperature "reservoirs", and to isolate the medium during the adiabatic operations. This observation is useful in designing the thermal components.

The switching embodiment of FIG. 6a suffers from large transients and high losses. The a.c.-excited system of FIG. 6b is smoother and eliminates switching, but requires an a.c. auxiliary source. The medium gets magnetized while the current is increasing in magnitude, and is demagnetized as the current falls in magnitude. Alternate thermodynamic cycles thus involve magnetizations in opposite directions, and the thermodynamic frequency is twice that of the alternating current.

Figure 6C:
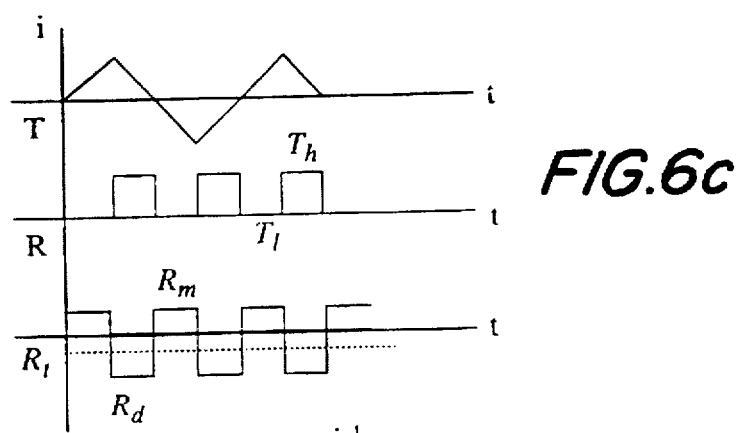
FIG. 6c is a timing diagram for operating the a.c. excited engine shown in FIG. 6b as an electrical power source.
Figure 6D:
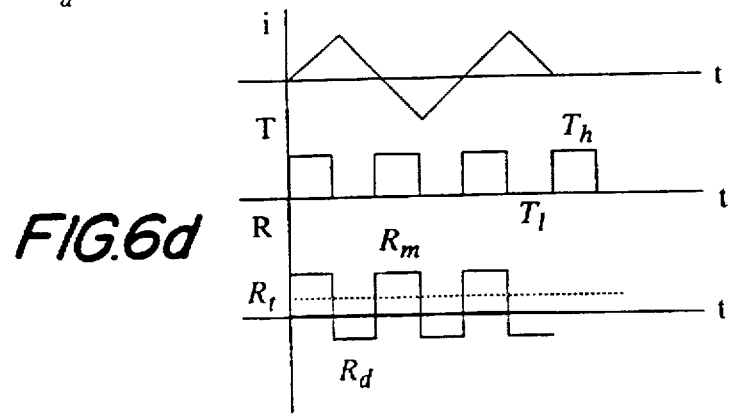
FIG. 6d is a timing diagram for operating the a.c. excited engine shown in FIG. 6b as a refrigerator.

The timing diagrams for power generation and refrigeration, FIGS. 6c and 6d respectively, show that the difference in the operation is in the phase of the temperature cycling relative to the current.

For generating electrical power, the temperature must be high whenever the current is falling in magnitude, as in FIG. 6c. The reverse, with the temperature high while the current increases, (FIG. 6d), makes the cycle a refrigerator. The temperature waveform is idealized as a square wave, with the horizontal regions corresponding to isothermal operations. The adiabatic operations are confined to the vertical changes in the temperature.

The equivalent resistance of the engine (FIG. 6c) is positive during the magnetizations ($R_m$) and negative during the demagnetizations ($R_d$), since electrical energy is lost to the medium during the former and gained from it in the latter. Without the temperature changes, the average magnetizing resistance $R_m > 0$ would equal the average demagnetizing value $R_d < 0$, and the average resistance $R_t$ would be zero. With the temperature cycling, the average demagnetizing resistance dominates to give a net negative resistance $R_t$. Note that the total load resistance $R_L$ includes the ohmic resistance of the coil (30).

Changing the phase of the temperature cycle relative to the current, by a half cycle as in FIG. 6d, makes the net induced resistance $R_t$ positive, and the engine then draws electrical power, since it operates as a refrigerator.

Figure 6E:
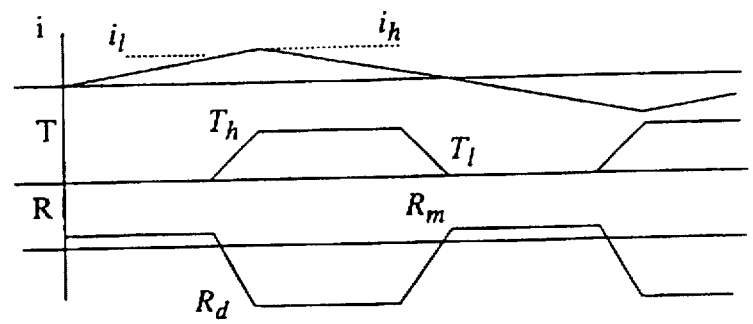
FIG. 6e is a detailed timing diagram corresponding to FIG. 6c, for operating the a.c. excited engine shown in FIG. 6b as an electrical power source.

FIG. 6e shows the timing diagram of FIG. 6c in greater detail for implementing a Carnot engine cycle. The medium is adiabatically raised to the maximum temperature $T_h$ by the current rising to $i_h$. Thereafter, the dropping current causes demagnetization, and heat must be transferred into the medium to maintain its temperature at $T_h$, till the current drops to $i$ given by $$L_h i^2 / 2 = c \delta T \qquad (57)$$

or $$i = \sqrt{\frac{2 c \delta T}{L_h}},$$

where c is the applicable specific heat of the medium. The medium is then isolated, and allowed to cool adiabatically till the current drops to zero, when the temperature will have reduced to $T_l$. The medium is maintained at $T_l$ by drawing out the heat generated as the medium is magnetized by the rising current. When the current reaches $i_l$ given by equation (53), the medium is isolated again for adiabatically warming up to $T_h$ for the next cycle. The induced resistance of the engine correspondingly varies with the temperature as shown.

The heat transfer subsystem could be controlled electronically in response to the instantaneous current. It may be useful instead to take the instantaneous load voltage as the heat transfer control parameter. This provides tolerance for changing loads and avoids runaway voltage or current as follows.

Let the load current be usually maintained within a small relative phase of the voltage. If the current goes a little out of phase, its magnetic field becomes correspondingly out of phase with the temperature cycle. From the preceding theory, $R_t$ would drop in magnitude, and the engine would deliver less power to the reactive load. In the event that a load puts the current more than quarter cycle out of phase, ie. it sends power back, the engine would operate as a refrigerator and take out the excess power by pumping heat. This is particularly useful for regenerative braking when using the electrical output of the electromagnetic engine to drive a motor.

Figure 6F:
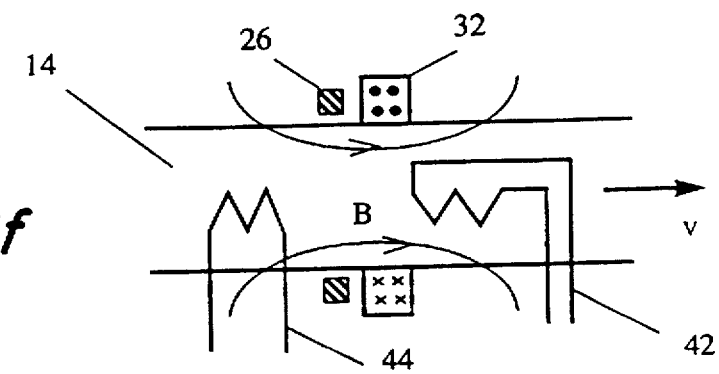
FIG. 6f is a schematic diagram of the electromagnetic analog of the magnetic turbine shown in FIG. 5c.

The electromagnetic turbine in FIG. 6f is substantially similar to the mechanical version in 5c, with a coil (32) replacing the magnet (24). The net resistance $R_t$ is a negative value when generating electrical power. A second magnet (26) may be optionally included for keeping the medium in motion using the magnetocaloric effect.

Figure 6G:
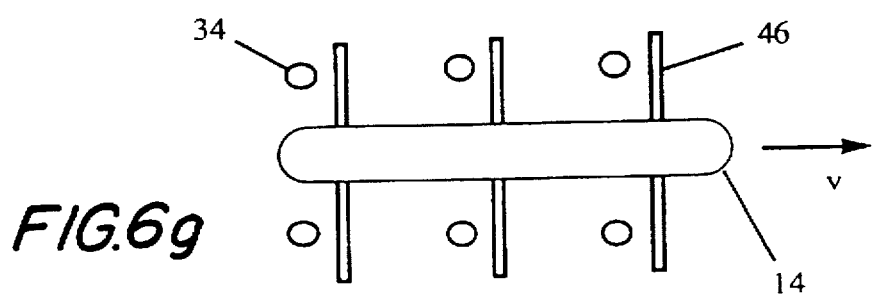
FIG. 6g is a schematic diagram of a cascade of multiple electromagnetic turbine stages.

FIG. 6g illustrates how multiple stages of an electromagnetic turbine can be cascaded. Each stage consists of a magnetizing coil (34) followed by a heating element (46). The magnetic medium (14) passes through the stages in succession. As the medium emerges from the field of a magnetizing coil, it passes over the adjacent heating element, and induces power into the coil as it demagnetizes. The medium is assumed to cool between the stages. The coils could be connected in series or in parallel, or to different load circuits.

Equation (48) shows that the instantaneous equivalent resistance R depends on the instantaneous susceptibility as well as on the instantaneous rate of change of the current. One ordinarily has much less control over the shape of the temperature changes, which tend to be smoother than the electrical parameters. Especially when not using a linear paramagnetic medium, the instantaneous resistance is not likely to be a smooth function of time. Some degree of control may be obtained through the rate of change of current, but in general, a reciprocating electromagnetic engine would generate significant harmonics and the output power needs filtering.

Although equally operable with a.c., the turbine form is essentially a d.c. device, in which the positive and negative resistance phases are contributed simultaneously by different portions of the continuous medium, so the instantaneous resistance is constant at $R_r$. The instantaneous resistance is due to the net emf contributions of the elementary magnetic moments magnetizing and demagnetizing in the different portions of the medium.

Synchronous cooling

Synchronous dissipation in digital circuits, ie. dissipation in bursts triggered by a clock, can be alleviated by instantly converting some of the heat to electrical power using an electromagnetic heat engine. Consider an engine as in FIG. 6b applied for cooling a simple digital circuit to which the magnetic medium is thermally coupled. The engine is constructed with a coil around the medium, and the auxiliary source voltage is derived from the clock, so that the bursts of dissipation occur during the demagnetization phase of the current waveform.

Figure 6H:
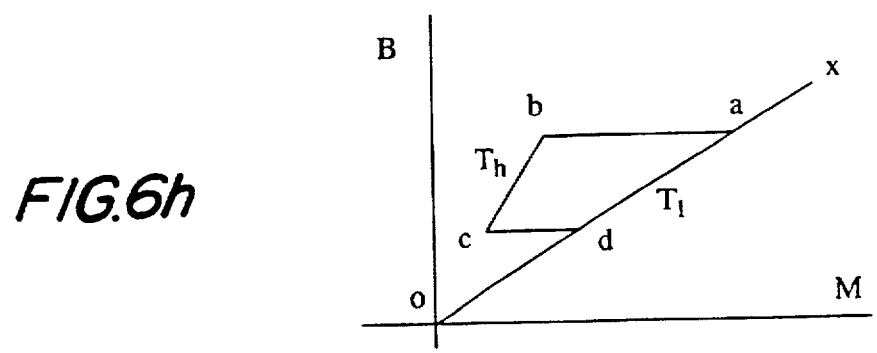
FIG. 6h is a graph of the applied field versus magnetization showing the typical thermodynamic cycle when the electromagnetic engine of the invention is applied to the cooling of digital integrated circuits.

With the quiescent dissipation alone, the digital circuit soon reaches thermal equilibrium, so the B-M relation would be linear and would follow the line ox in FIG. 6h as the engine current varies in the coil. State transition of one or more gates, causing dissipation, raises the temperature locally. The demagnetization phase is arranged to occur throughout the transitions, so that the local thermodynamic state follows the typical path abcda in the figure.

The segment ab corresponds to the sharp rise in the local temperature as the gates begin to transit. This onset of dissipation drops the magnetization rapidly without much change in the engine current. The local temperature remains high for the duration of the gate currents, while the engine current drops, producing the isothermal demagnetization along bc. When the gate currents cease, the local temperature drops to the mean chip temperature raising the magnetization along cd. The engine current is raised again along da to prepare for the next burst of transitions.

The diagram is obviously simplistic and represents the thermodynamic state only in the vicinity of the transiting gates. Only a relatively small fraction of the gates in a digital integrated circuit chip actually change state at any given clock. Conditions near non-transiting gates merely follow the line ox in the diagram. The cycle abcda applies to the neighborhood of the transiting gates, and the area of the cycle represents the heat converted away as electrical energy. The total heat converted in a given cycle is the integral of the local contribution over the transiting gates:

$$\delta q = \int_{circuit} d^3x \int_{local} \frac{-BdM}{\mu_0}, \quad (58)$$

where the outer integral is over the physical volume of the digital circuit, and the local integral is proportional to the area of the path abcda.

The inductive mechanism permits the use of a single coil of one or more turns around the digital circuit to construct the cooling engine, at least when the clock frequency is low. One does not need to place separate coils around the individual logic gates. Since only a few gates transit each cycle, the per-cycle dissipation is quite small, and the power conversion density of the engine need not be high. Hence neither very high susceptibility media nor very high applied fields and engine currents to produce them, are particularly necessary.

For example, a CMOS processor chip dissipating 30 W at 100 MHz is only dissipating 300 nJ per cycle. If two-thirds of this power is synchronous dissipation, ie. in response to the clock and only about 1 thousand gates are transiting each cycle on an average, this represents 200 pJ per gate. Over the die volume, including substrate, of about 0.1 cm$^3$, the dissipation amounts to only 2 μJ/cm$^3$, well within the capability of paramagnetic elements.

The inductive mechanism means that the conversion efficiency depends on how much and how quickly the magnetic medium is locally heated by the gate transition currents. High thermal conductivity of the circuit and close thermal contact with the medium are desirable. If the dissipation takes more time to reach the medium than the clock period, the dissipation is no longer distinctly periodic and the engine would not be able to cool the circuit At lower gate densities and in simple circuits, a layer of magnetic material in the substrate or deposited uniformly over the chip would probably suffice for synchronous cooling. At higher densities and operating speeds, atoms with high magnetic moments, such as those of iron or gadolinium, may be ion-implanted in the substrate or an overlay in greater numbers in the expected regions of dissipation. Conduction electrons cannot themselves function as magnetic thermodynamic media, but magnetic atoms in the lattice can, and if present, would provide the strongest instant coupling of ohmic dissipation.

At the higher gate densities, on-chip electromagnetic delays become significant, and different regions of the circuit would be operating out of phase, so a simple coil around the circuit may not be sufficient for synchronous cooling. It would be also unsuitable at higher operating frequencies because of its time constant. In either case, a transmission line approach becomes useful for locally synchronizing the applied magnetic field with the bursts. The field is then applied by a "magnetizing clock wave" travelling slightly ahead of the logic clock.

Embodiments in detail

FIGS. 7a–b and 8a–b describe a reciprocating magnetic engine and an electromagnetic turbine, respectively, in greater detail. The reference numerals used in these drawings are listed in Table 4 below.

TABLE 4

| # | Embodiment numerals Denotes | Figures |
|---|---|---|
| 100 | left working element | 7a |
| 102 | right working element | 7a |
| 104 | working material | 7b |
| 110 | ferromagnetic block | 7a |
| 112 | center pole in 110 | 7a |
| 120 | permanent magnet piston | 7a |
| 140 | pipes within 104 | 7b |
| 150 | crankshaft | 7a |
| 152 | wheel | 7a |
| 160 | spark mechanism | 7b |
| 162 | injected gases | 7a,b |
| 164 | exhaust gases | 7a,b |
| 210 | ring of magnetic material | 8a,b |
| 220 | coil | 8a |
| 242 | heat exchanger (hot) | 8a |
| 244 | heat exchanger (cold) | 8a |
| 260 | hot liquid | 8b |
| 262 | pan collecting 260 | 8b |
| 280 | furnace | 8b |

A reciprocating magnetic engine

Figure 7A:
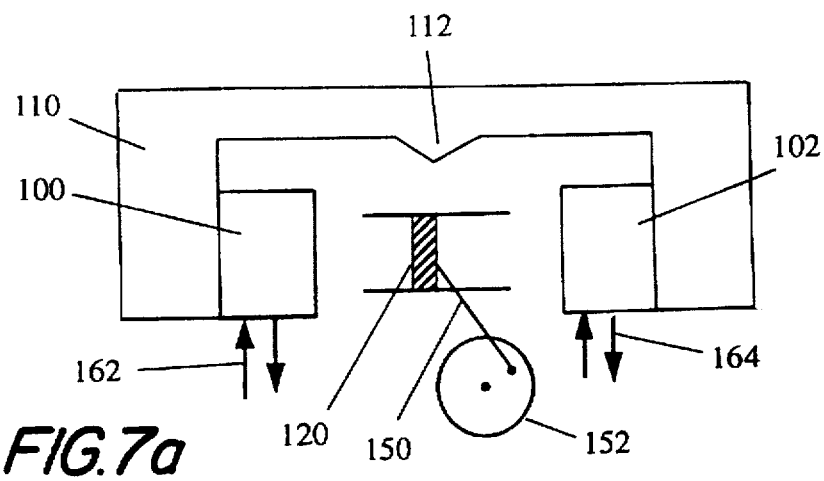
FIG. 7a is a schematic diagram of a reciprocating magnetic engine.

FIG. 7a shows a reciprocating magnetic engine using two engine elements (100, 102) made mostly of a magnetic working material, and a moving permanent magnet (120). The magnet (120) functions as the "piston", being constrained to move linearly between the engine elements (100, 102). A ferromagnetic block (110) confines the magnetic flux. The block has a small center pole (112). The flux tends to concentrate between the engine elements and the center pole. When not operating, both the engine elements are cold, and the magnet will rest in stable equilibrium on one or the other side of the center pole (112). The magnet (120) is connected to a crankshaft (150) to transmit power to a wheel (152).

The engine elements (100, 102) can be heated and cooled independently as described below. The engine operation begins with heating the element closer to the magnet (120), which increases its reluctance, so the magnet is now attracted to the other side of the center pole (112). The heating is then switched to the other side, while the first element cools, to move the magnet back to the first element. The operation is analogous to a typical steam engine, in which the piston is pushed in either direction by steam.

Figure 7B:
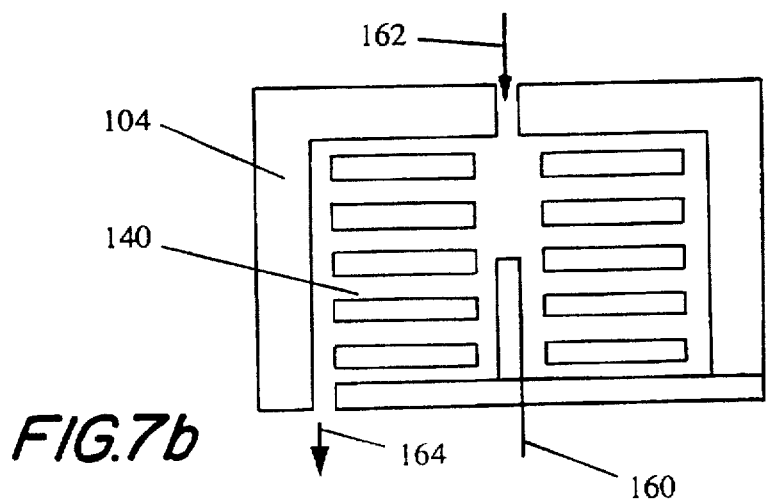
FIG. 7b is a schematic diagram of an engine element for the engine shown in FIG. 7a, suitable for internal combustion.

The engine elements (100, 102) may be designed for internal or external combustion. An internal combustion engine element might consist of a block of the working magnetic medium (140), as shown in FIG. 7b. For heating the element, a gaseous air-fuel mixture (162) is injected into pipes (140) embedded in the medium, and ignited by an electric spark mechanism (160) at a strategic position within the element so that the heat spreads rapidly through the embedded pipes in a short time compared to the mechanical motion of the magnet. For example, at 50 Hz (≡3000 rpm) operation, the combustion and the heating should be complete in 10 ms. For cooling, the burnt gases are flushed out (164) by injecting cool air and then a fresh charge of air-fuel mixture. The internal combustion element functions like a petrol (Otto) engine.

An engine element with embedded pipes can be used with external combustion. The element is heated by injecting a hot fluid, and cooled by injecting a cold fluid. Note that most of the heat is removed as work done during demagnetization.
Calculations for reciprocating engine Let the working elements (100, 102) be made of soft iron. At 50 Hz, 0.1 T applied field variation, the saturation power density is over 4 kW/litre. With a backoff-cure-efficiency factor of 0.4, the engine can yield up to 1.5 kW/litre. If the working elements are each of 1 cm³, the maximum power is about 3 W.

Clearly, a magnetic engine is not very advantageous over a gas engine at the same frequency with respect to power density.

But similar figures are applicable to the completely stationary electromagnetic engine of FIG. 6b. Using an internal combustion element constructed as in FIG. 7b and containing 1 litre of soft iron to serve as its magnetic medium (10), the electromagnetic engine potentially generates up to 1.5 kW at mere 50 Hz from heat without using moving parts or a thermodynamic fluid.

Since it can conceivably be operated at 100 or 200 Hz instead, this electromagnetic engine can potentially yield 3 or 6 kW respectively. Incidentally, a 100 Hz or 120 Hz is preferable for operating at the common a.c. supply frequency of 50 or 60 Hz respectively.
An electromagnetic turbine The electromagnetic turbine of FIG. 8a uses a horizontally mounted ring (210) of a solid magnetic working medium spinning through a coil (220), which is connected to an electrical load circuit and an auxiliary electric source to setup the load current.

Figure 8A:
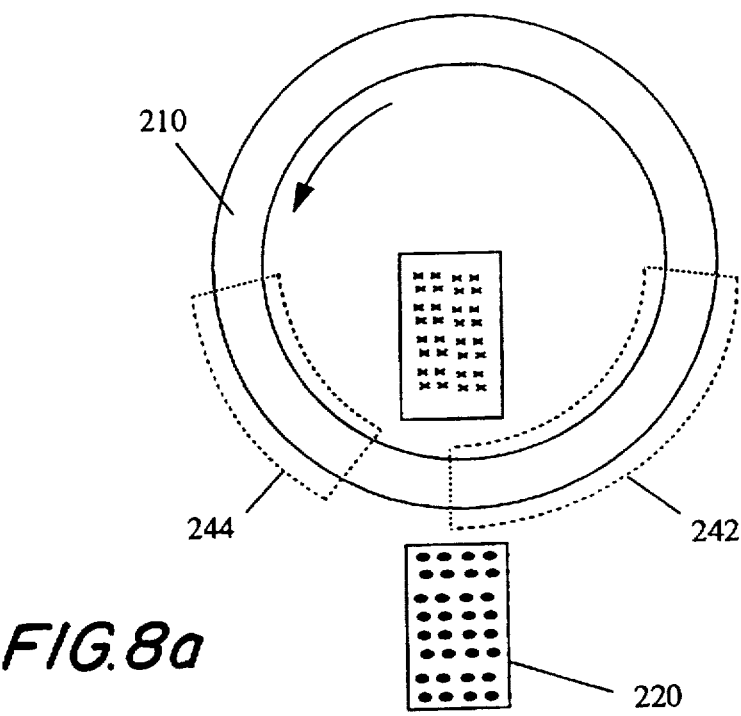
FIG. 8a is a top view of an electromagnetic turbine.
Figure 8B:
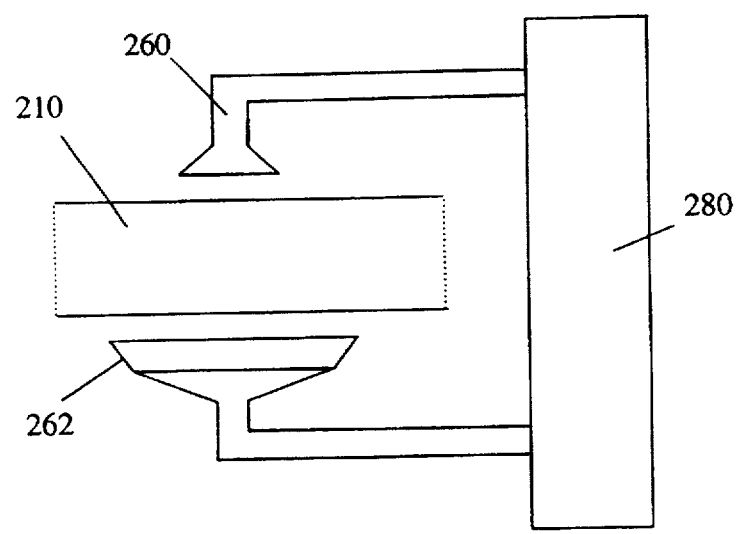

A heat exchanger (242) heats the ring immediately as it emerges from the coil, and a second heat exchanger (244) cools it as it enters the coil. The hot exchanger may be built as shown in FIG. 8b, in which a liquid (260) carrying heat from a furnace (280) is simply poured on the ring and collected below by a pan (262). The cold heat exchanger would use a liquid coolant in like manner. In high power application, the heat exchangers may use water for cooling, and a liquid metal for heating, with a nuclear reactor replacing the furnace.

Equations (50) and (56) allow the required number of turns N to be computed from the magnetic circuit as $$N^2 = \frac{R_M R_t}{\nu f \eta}.$$

It should however be noted that the ring (210) is not really the magnetic circuit for the coil (220), because the engine operation depends on each portion of the ring becoming magnetized as it approaches the coil, and becoming demagnetized as it recedes. Consequently, the magnetic circuit must be completed, possibly through stationary ferromagnetic segments, outside of the ring medium, such that the flux can enter or leave the ring in the region of the heat exchangers, where the magnetization is intended to change the most for ideally following the Carnot cycle.

Since the applied field depends on the current and the number of turns per unit length of the magnetic circuit, one requires 80 kA-turns/m for 0.1 T applied field, irrespective of the length of the magnetic circuit. Thus, a corresponding number of turns may be wound on the ferromagnetic segments, so that the coil (220) only requires turns proportional to the effective portion of the magnetic circuit passing through the ring (210).
Calculations for electromagnetic turbine In any case, if the ring be of soft iron, the magnetic circuit would probably be at least as long as the ring circumference. If the ring is of 4 cm radius and 1 cm² cross-section, the circumference is about 25 cm, requiting 2500 turns at 8 A. The total volume of the medium being about 25 cm³, the engine can generate up to 100 W at 50 Hz, producing 12.5 V emf at a negative resistance of 1.5625 Ω. For the same power, it can be operated alternatively at 80 A using 250 turns to produce 1.25 V at −15.625 mΩ.

A small amount of ferrofluid can be used to provide a low reluctance bridge between the moving ring and the stationary ferromagnetic segments to reduce the overall magnetic circuit and the total number of turns.

ADVANTAGES

From the foregoing, it will be appreciated that the present invention provides an electromagnetic heat engine having the following advantages.

The electromagnetic engine overcomes the limitation on speed due to mechanical operation in prior art magnetic engines, thus providing higher power densities.

The electromagnetic engine is generally useful over prior art heat engines because it eliminates moving parts, including, in the a.c. reciprocating embodiments, that of the medium.

For example, small solid-state electromagnetic heat pumps operating at high frequencies can augment local heating applications including heating irons and electric ovens. The desired higher temperature is first established in an object of low heat capacity by other means, such as a resistance, and the electromagnetic heat pump then supplies enough heat to maintain the temperature. Such applications would generally require fast thermal switches to thermally connect the magnetic medium alternately to the two temperatures.

At sufficiently high operating frequencies, electromagnetic heat engines can become useful for refrigeration at ordinary temperatures, thus providing an alternative to the fluid refrigerants in use today.

Though magnetic refrigerators have been employed in cryogenic applications, their non-contact nature has not been particularly useful because of the mechanical motion required. Electromagnetic engines allow the non-contact nature to be better exploited, since the medium need not move, nor have particular shapes for optimal operation. Indeed, as explained for synchronous cooling, the magnetic medium can be closely coupled with or even constitute part of the object to be cooled. The electromagnetic engine is particularly suited for cooling digital Josephson circuits.

The elimination of motion and shape requirements means the electromagnetic engines are realizable in unusual shapes and sizes, and further, reaps a thermodynamic benefit generally unavailable to prior art magnetic and non-magnetic heat engines, in that local hot spots are directly coupled and utilized for higher efficiency in the electromagnetic engine, as particularly described for synchronous cooling.

At the high power end, electromagnetic engines are likely to be simpler to design, construct and control than the prior art gas engines and steam turbines, apart from their unique no-movement operability. For example, spacecraft power generators cannot involve mechanical means for converting the heat from an on-board reactor, and frequently depend on thermocouples giving about 4% efficiency. Electromagnetic engines address one end of this conversion problem, viz. eliminating intermediate mechanical form, while potentially providing useful power densities. The foregoing calculations show that if a high power thermal switch be available for operating at 400 Hz, a completely solid-state electromagnetic engine can typically provide about 25 kW/litre of soft iron medium.

With the exception of the cryogenic magnetic refrigerators, prior art heat engines have invariably involved complicated fluid dynamics, necessitating expensive and time consuming experiments. Turbulence and magneto-fluid-dynamics add to the analytical and computational complexity of the prior art engines. Even in cryogenic magnetic refrigerators, both the paramagnetic medium and the field of the superconducting magnets must be specially shaped for approaching the Carnot cycle.

Electromagnetic engines are also much easier to model and design, using existing thermal diffusion and electromagnetic field analysis tools, and do not require fluid media even in the turbine forms, considerably reducing the modelling complexity. The resulting simplicity also means much better design and control are possible with electromagnetic engines.

The electromagnetic engine also permits a wider choice of thermodynamic media, since the medium need not be electrically conducting or even fluid. With special properties, including fluidity and conductivity, being no longer required, more magnetic materials can be investigated and developed for thermodynamic and power applications.

Superconducting magnets have hitherto been used as very strong permanent magnets, and almost never in series with electrical loads. Superconductive coils can now be utilized in a more active role for carrying very high load currents to generate high applied fields in electromagnetic engines for power generation.

Although the invention has been described with reference to preferred embodiments, it will be appreciated by one of ordinary skill in the arts of thermodynamics, magnetics and electricity that numerous modifications are possible in the light of the above disclosure.

For example, electromagnetic heat engines are not limited to Carnot cycles. Non-Carnot cycles with or without regeneration are equally applicable to electromagnetic engines. Also, an electromagnetic engine can be operated between any pair of temperatures that yield a difference of susceptibility. Further, electromagnetic engines may be used in conjunction with alternative means of heating or cooling. For instance, cryogenic magnetic refrigerators are operated only after the temperature has been lowered to 10 K or less by other means.

Likewise, synchronous cooling is not limited to CMOS integrated circuits, but is equally applicable to any system potentially generating periodic or predictable dissipation, including digital optical circuits. Even superconducting circuits, particularly those using high $T_c$ materials, are known to produce some dissipation, and are possible candidates for synchronous cooling.

All such variations and modifications are intended to be within the scope and spirit of the invention as defined in the claims appended hereto.

I claim:

1. A method for cooling a system having predictable bursts of dissipation using an electromagnetic heat engine, the heat engine including a magnetic medium having susceptibility that varies with temperature and placed in close thermal contact with the system, an electrical circuit means for carrying an electric current operable in magnetization and demagnetization states to create a magnetic field for magnetizing said magnetic medium, and an electrical load for absorbing energy from said magnetic field by demagnetization, the method comprising the steps of magnetizing said magnetic medium between said bursts of dissipation and demagnetizing said magnetic medium during said bursts of dissipation, such that said bursts of dissipation are converted to electrical energy in said electrical circuit means.

2. The method of claim 1, wherein said bursts of dissipation occur in different regions of the system at different times, the method further comprising placing portions of said magnetic medium in direct thermal contact with each of said regions, such that said electrical circuit means carries said current to each of said regions and said magnetization is performed on said medium between said bursts at each of said regions, and said demagnetization is performed on said medium during said bursts at each of said regions.

3. The method of claim 1, wherein the heat engine is operated synchronously with said bursts of dissipation.

* * * * *